US005302460A

United States Patent [19]

Pliefke et al.

[11] Patent Number: 5,302,460

[45] Date of Patent: Apr. 12, 1994

[54] SUPPORT MATERIAL FOR OFFSET-PRINTING PLATES IN THE FORM OF A SHEET, A FOIL OR A WEB PROCESS FOR ITS PRODUCTION AND OFFSET-PRINTING PLATE COMPRISING SAID MATERIAL

[75] Inventors: Engelbert Pliefke; Raimund J. Faust, both of Wiesbaden, Fed. Rep. of Germany

[73] Assignee: Hoechst Aktiengesellschaft, Frankfurt am Main, Fed. Rep. of Germany

[21] Appl. No.: 731,484

[22] Filed: Jul. 17, 1991

[30] Foreign Application Priority Data

Jul. 21, 1990 [DE] Fed. Rep. of Germany ....... 4023267

[51] Int. Cl.⁵ .......................................... B32B 15/08

[52] U.S. Cl. ................................ 428/461; 428/409; 428/462; 430/525; 430/526; 430/302; 101/453; 101/454; 101/457; 101/459; 526/265; 526/274; 526/287; 526/312

[58] Field of Search ...................... 428/409, 461, 462; 430/525, 526, 302; 101/459, 453, 454, 457; 526/265, 274, 287, 312

[56] References Cited

U.S. PATENT DOCUMENTS

| | | | |
|---|---|---|---|
| 2,714,066 | 7/1955 | Jewett et al. . | |
| 2,991,204 | 7/1961 | Astle . | |
| 3,181,461 | 5/1965 | Fromson . | |
| 3,232,783 | 2/1966 | Deal et al. . | |
| 3,258,339 | 6/1966 | Adams et al. | 96/86 |
| 3,276,868 | 10/1966 | Uhlig . | |
| 3,280,734 | 10/1966 | Fromson | 101/149.2 |
| 3,298,852 | 1/1967 | Beatty et al. . | |
| 3,440,050 | 4/1969 | Chu . | |
| 3,672,885 | 6/1972 | Ort . | |
| 3,672,966 | 6/1972 | Geisler et al. | 204/35 |
| 3,733,200 | 5/1973 | Takaishi et al. . | |
| 3,769,043 | 10/1973 | Morishima et al. | 106/2 |
| 3,860,426 | 1/1975 | Cunningham et al. . | |
| 3,861,917 | 1/1975 | Magnotta et al. . | |
| 3,902,976 | 9/1975 | Walls . | |
| 4,049,746 | 9/1977 | Muzyczko et al. | 260/851 |
| 4,116,695 | 9/1978 | Mori et al. | 96/86 |
| 4,153,461 | 5/1979 | Bergahauser et al. . | |
| 4,208,212 | 6/1980 | Kuzuwata et al. . | |
| 4,420,549 | 12/1983 | Cadwell | 430/158 |
| 4,427,765 | 1/1984 | Mohr et al. | 430/525 |
| 4,427,766 | 1/1984 | Mohr | 430/525 |
| 5,178,961 | 1/1993 | Faust et al. | 428/463 |
| 5,178,963 | 1/1993 | Faust et al. | 428/463 |

FOREIGN PATENT DOCUMENTS

| | | |
|---|---|---|
| 0110417 | 6/1984 | European Pat. Off. . |
| 0132379 | 1/1985 | European Pat. Off. . |
| 0149490 | 1/1985 | European Pat. Off. . |
| 1056931 | 5/1959 | Fed. Rep. of Germany . |
| 2947708 | 6/1980 | Fed. Rep. of Germany . |
| 63-112193 | 5/1988 | Japan . |
| 63-130391 | 6/1988 | Japan . |
| 647142 | 2/1979 | U.S.S.R. . |
| 815471 | 5/1959 | United Kingdom . |
| 907718 | 10/1962 | United Kingdom . |
| 1246696 | 9/1971 | United Kingdom . |
| 1414575 | 11/1975 | United Kingdom . |
| 1495895 | 12/1977 | United Kingdom . |

*Primary Examiner*—Patrick J. Ryan
*Assistant Examiner*—Marie R. Macholl
*Attorney, Agent, or Firm*—Foley & Lardner

[57] ABSTRACT

A support material for photosensitive substances, useful in the production of offset-printing plates, is disclosed. The support material comprises mechanically, chemically or electrochemically roughened aluminum or an aluminum alloy in the form of a sheet, a foil or a web, and which is coated on at least one side with a hydrophilic polymer which comprises (a) at least 2 mol% of units having acidic side groups and (b) at least 2 mol% of units having basic side groups which are capable of being protonated.

31 Claims, No Drawings

SUPPORT MATERIAL FOR OFFSET-PRINTING PLATES IN THE FORM OF A SHEET, A FOIL OR A WEB PROCESS FOR ITS PRODUCTION AND OFFSET-PRINTING PLATE COMPRISING SAID MATERIAL

BACKGROUND OF THE INVENTION

The invention relates to a support material for offset-printing plates in the form of a sheet, a foil or a web, comprising pretreated aluminum or an alloy thereof and having, on at least one surface, a hydrophilic coating of a polymer containing acidic side groups. The invention also relates to a process for the production of a support material and to a printing plate comprising the support material.

Support materials for offset-printing plates are provided, on one or both sides, with a photosensitive layer (reproduction layer), which is applied either directly by the user or by the manufacturers of precoated printing plates. With the aid of this layer a printing image is produced by a photomechanical route. Following the production of the printing image, the layer support comprises the image areas which print and, simultaneously, the hydrophilic image background required for the lithographic printing process is formed in the areas which are free from an image (non-image areas).

Thus, a layer support for a photosensitive material used for the production of lithographic plates must meet the following requirements. First, those portions of the photosensitive layer which have become comparatively more soluble following exposure must be capable of being easily removed from the support by a developing operation, in order to produce the hydrophilic non-image areas without leaving a residue. The support, which has been laid bare in the non-image areas, must possess a high affinity for water, i.e., it must be strongly hydrophilic, in order to accept water, rapidly and permanently, during the lithographic printing operation, and to exert an adequate repelling effect with respect to the greasy printing ink. The photosensitive layer must also exhibit an adequate degree of adhesion prior to exposure, and those portions of the layer which print must exhibit adequate adhesion following exposure.

Base materials which can be used for layer supports of this kind include aluminum, steel, copper, brass or zinc foils, but also plastic sheets or paper. By appropriate processing operations, such as, for example, graining, matte chromium-plating, surface oxidation and/or application of an intermediate layer, these raw materials are converted into layer supports for offset-printing plates. The surface of aluminum, which is presently the most frequently used base material for offset-printing plates, is roughened according to known methods, e.g. dry-brushing, slurry-brushing, sandblasting, chemical and/or electrochemical treatment, or combinations of these treatments. In order to increase the resistance to abrasion, the roughened substrate may additionally be treated in an anodizing step to produce a thin oxide layer.

In practice, the support materials, and particularly anodically oxidized aluminum support materials, are often subjected to a further treatment step, before applying a photosensitive layer, in order to improve the adhesion of the layer, increase the hydrophilic properties and/or improve the developability of the photosensitive layers. Such treatments can be carried out according to known methods.

For example, DE-C-907 147 (=U.S. Pat. No. 2,714,066), DE-B-14 71 707 (=U.S. Pat. No. 3,181,461 and U.S. Pat. No. 3,280,734) or DE-A-25 32 769 (=U.S. Pat. No. 3,902,976) describe processes for hydrophilizing support materials for printing plates, comprising aluminum which has optionally been anodically oxidized. In these processes, the materials are treated, with or without the application of an electric current, with an aqueous solution of sodium silicate.

DE-A-11 34 093 (=U.S. Pat. No. 3,276,868) and DE-C-16 21 478 (=U.S. Pat. No. 4,153,461) describe the use of polyvinylphosphonic acid or of copolymers based on vinylphosphonic acid, acrylic acid and vinyl acetate to hydrophilize support materials for printing plates, comprising aluminum which has optionally been anodically oxidized. The use of salts of these compounds is also mentioned, but is not specified in detail, According to DE-B-13 00 415 (=U.S. Pat. No. 3,440,050) complex fluorides of titanium, zirconium or hafnium are used to produce an additional hydrophilization of aluminum oxide layers on support materials for printing plates.

Apart from these hydrophilizing methods, which have become known in particular, numerous polymers have been described for use in this field of application. For example, DE-B-10 56 931 describes water-soluble, linear copolymers on a basis of alkyl vinyl ethers and maleic anhydrides which are used in photosensitive layers for printing plates. Of these copolymers those are particularly hydrophilic, in which the maleic anhydride component has not been reacted or has been more or less completely reacted with ammonia, an alkali metal hydroxide or an alcohol.

As disclosed in DE-B-10 91 433, support materials for printing plates comprising metals are hydrophilized with film-forming organic polymers, for example, with polymethacrylic acid or sodium carboxymethylcellulose or sodium hydroxyethylcellulose, in the case of aluminum supports or with a copolymer of methyl vinyl ether and maleic anhydride, in the case of magnesium supports.

According to DE-B-11 73 917 (=UK 907,718) support materials for printing plates comprising metals are hydrophilized by means of polyfunctional amino/urea-/aldehyde resins or sulfonated urea/aldehyde resins which are initially water-soluble and are cured to a water-insoluble state on the metal support.

DE-B-12 00 847 (=U.S. Pat. No. 3,232,783) describes a hydrophilic layer which is prepared on a support material for printing plates by coating the support first with a) an aqueous dispersion of a modified urea/formaldehyde resin, an alkylated methylolmelamine resins or a melamine/formaldehyde/polyalkylenepolyamine resin, then with b) an aqueous dispersion of a polyhydroxy or polycarboxy compound, such as sodium carboxymethylcellulose, and the substrate coated in this manner is finally treated with c) an aqueous solution of a Zr, Hf, Ti or Th salt.

DE-B-12 57 170 (=U.S. Pat. No. 2,991,204) describes a hydrophilizing agent for support materials for printing plates, comprising a copolymer which contains not only acrylic acid, acrylate, acrylamide or methacrylamide units, but also Si-trisubstituted vinylsilane units.

DE-A-14 71 706 (=U.S. Pat. No. 3,298,852) discloses the use of polyacrylic acid as a hydrophilizing agent for support materials for printing plates made of aluminum, copper or zinc.

The hydrophilic layer on a support material for printing plates described in DE-C-21 07 901 (=U.S. Pat. No. 3,733,200) is formed of a water-insoluble hydrophilic acrylate or methacrylate homopolymer or copolymer having a water absorption of at least 20% by weight.

DE-B-23 05 231 (=U.S. Pat. No. 1,414,575) describes a process for hydrophilizing support materials for printing plates, in which a solution or dispersion comprising a mixture of an aldehyde and a synthetic polyacrylamide is applied to the support.

DE-A-23 08 196 (=U.S. Pat. No. 3,861,917) discloses hydrophilization of grained and anodically oxidized aluminum supports for printing plates, using ethylene/-maleic anhydride or methyl vinylether/maleic anhydride copolymers, polyacrylic acid, carboxymethylcellulose, sodium poly(vinylbenzene-2,4-disulfonic acid) or polyacrylamide.

DE-B-23 64 177 (=U.S. Pat. No. 3,860,426) describes a hydrophilic subbing layer for offset-printing plates of aluminum, which is disposed between the anodically oxidized surface of the printing plate support and the photosensitive layer and contains a cellulose ether and, additionally, a water-soluble Zn, Ca, Mg, Ba, Sr, Co or Mn salt. The cellulose ether is contained in the hydrophilic subbing layer in a layer weight of 0.2 to 1.1 $mg/dm^2$, the same layer weight is specified for the water-soluble salts. The mixture of cellulose ether and salt is coated on the support in the form of an aqueous solution employinq, if appropriate, an additional organic solvent and/or a surfactant.

To consolidate anodically oxidized aluminum surfaces, U.S. Pat. No. 3,672,966 describes aqueous solutions of acrylic acid, polyacrylic acid, polymethacrylic acid, polmaleic acid or copolymers of maleic acid with ethylene or vinyl alcohol, which are applied after sealing the surfaces, in order to prevent seal coats.

The hydrophilizing agents used for printing plate support materials according to U.S. Pat. No. 4,049,746 contain saline reaction products obtained from water-soluble polyacrylic resins containing carboxyl groups and polyalkylenimine/urea/aldehyde resins.

UK 1,246,696 describes hydrophilic colloids, such as hydroxyethylcellulose, polyacrylamide, polyethylene oxide, polyvinylpyrrolidone, starch or gum arabic for use as hydrophilizing agents on anodically oxidized aluminum supports for printing plates.

EP-B-0 149 490 describes compounds containing amino groups and, in addition, carboxyl or carboxylate groups, sulfo groups or hydroxyl groups, which are used for a hydrophilizing treatment. However, this publication starts out from monomers and specifies a molecular weight of 1000 as an upper limit.

For hydrophilizing support materials for printing plates the prior art has also disclosed the use of those metal complexes which have low-molecular weight ligands. These include, for example: complex ions comprising divalent or polyvalent metal cations and ligands including ammonia, water, ethylenediamine, nitrogen oxide, urea or ethylenediaminetetraacetate, according to DE-A-28 07 396 (=U.S. Pat. No. 4,208,212); iron cyanide complexes, such as $K_4(Fe(CN)_6)$ or $Na_3(-Fe(CN)_6)$, in the presence of heteropolyacids, such as phosphomolybdic acid or the salts thereof or of phosphates, according to U.S. Pat. No. 3,769,043 and/or U.S. Pat. No. 4,420,549, and iron cyanide complexes in the presence of phosphates and complexing agents, such as ethylenediaminetetraacetic acid, for use in electrophotographic printing plates having a zinc oxide surface, according to U.S. Pat. No. 3,672,885.

EP-A-0 069 320 (=U.S. Pat. No. 4,427,765) describes a process, in which the salts of polyvinylphosphonic acids, polyvinylsulfonic acids, polyvinylmethyl-phosphinic acids and other polyvinyl compounds are used as post-treating agents.

DE-A-26 15 075 (=UK 1,495,895) describes a process for treating image-carrying offset-printing plates, which uses polyacrylamide or a mixture of polyacrylamide and polyacrylic acid.

SU-A-647 142 teaches the use of a copolymer of acrylamide and vinyl monomers for hydrophilizing offset-printing plates.

DE-C-10 91 433 describes a process for post-treating supports for offset-printing plates using polymers of methacrylic acid, methyl vinyl ether and maleic anhydride.

Acrylamide for use in the treatment of printing plate supports is also mentioned in DE-A-25 40 561.

To the same end, in particular to improve the storability of printing plates, DE-A-29 47 708 describes, among others, Ni salt solutions of acrylamide and acrylic acid as well as of acrylamide and vinylpyrrolidone.

The above-described methods, however, have more or less serious disadvantages, which means that the support materials so prepared often no longer meet the requirements which must now be met in offset printing in view of developer resistance, water/ink balance, roll-up characteristics and print run stability. Thus, for example, after treating support surfaces with alkali metal silicates which produce a good developability and good hydrophilic properties, a certain deterioration of the storability of photosensitive layers applied to these surfaces must be accepted and the print run of a printing plate post-treated in this manner is drastically lowered.

Although the complexes of the transition metals basically enhance the hydrophilicity of anodically oxidized aluminum surfaces, they have, nevertheless, the disadvantage of being very readily soluble in water, such that they can be easily removed upon developing the layer with aqueous developer systems which lately contain increasing proportions of surfactants and/or chelate formers which have a high affinity for these metals. As consequence, the concentration of the transition-metal complexes on the support surface is more or less strongly reduced, which may also reduce the hydrophilic action.

When supports are treated with water-soluble polymers, without having a possibility of anchoring these polymers, the good solubility of the latter, in particular in aqueous-alkaline developers which are predominantly used for developing positive-working photosensitive layers, will also lead to a marked decrease in the hydrophilizing effect.

Monomeric, hydrophilic compounds, as described, for example, in EP-B-0 149 490, generally have the disadvantage that during the developing and printing processes, they are relatively quickly washed away from the bared surface in the non-image areas and lose their hydrophilizing action, since an insufficient number of anchoring positions are present in the surface.

Even combining a mixture of a water-soluble polymer, such as cellulose ether, and a water-soluble metal salt, leads to reduced adhesion of the reproduction layer, because the layer weights and thus the layer thicknesses used are relatively high (see DE-B-23 64 177). Reduced layer adhesion may, for example, manifest itself by the fact that, in the developing process, portions of the developer liquid penetrate under image areas.

SUMMARY OF THE INVENTION

Accordingly, it is an object of the present invention to provide a support material which has good hydrophilizing properties and is suitable for use as a support for positive-working, negative-working or electrophotographically working photosensitive layers.

Another object of the present invention is to provide a support material which does not give rise to reduced storability of the layers, to reactions between the hydrophilizing agent and the photosensitive layer, or to impaired layer adhesion.

A further object of the present invention is to provide a process for producing the foregoing support material.

In accomplishing the foregoing objectives, there has been provided, in accordance with one aspect of the present invention, a support material for offset-printing plates, which comprises mechanically, chemically or electrochemically roughened aluminum or an aluminum alloy in the form of a sheet, a foil or a web, and which is coated on at least one side with a hydrophilic coating comprising a hydrophilic polymer which comprises (a) at least 2 mol% of units having acidic side groups and (b) at least 2 mol% of units having basic side groups which are capable of being protonated.

In accordance with another aspect of the present invention there is provided a process for the production of the above-described support material for offset-printing plates which comprises the steps of: providing mechanically, chemically or electrochemically roughened aluminum or an aluminum alloy in the form of a sheet, a foil or a web; coating at least one side of the aluminum or aluminum alloy by immersion treatment or electrochemical treatment with a hydrophilic coating comprising a hydrophilic polymer as described above dissolved in an aqueous solution in a concentration of about 0.001 to 10.0 wt% to form a layer, and drying the layer.

In a preferred embodiment, the process includes the further step of treating the coated aluminum or aluminum alloy with a salt solution comprising metal cations selected from the group consisting of $V^{5+}$, $Bi^{3+}$, $Al^{3+}$, $Fe^{3+}$, $Zr^{4+}$, $Sn^{4+}$, $Ca^{2+}$, $Ba^{2+}$, $Sr^{2+}$, $Ti^{3+}$, $Co^{2+}$, $Fe^{2+}$, $Mn^{2+}$, $Ni^{2+}$, $Cu^{2+}$, $Ce^{4+}$, $Zn^{2+}$ or $Mg^{2+}$ prior to the drying step.

In accordance with still another aspect of the present invention there is provided a presensitized printing plate comprising a support material as described above and a photosensitive layer applied to a surface of the support material coated with the hydrophilic polymer.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The support material according to the invention is in the form of a sheet, a foil or a web, and comprises mechanically, chemically or electrochemically roughened and optionally anodized aluminum or an alloy thereof which is coated on at least one side with a hydrophilic coating formed of a polymer containing acidic side groups, wherein the hydrophilic polymer comprises at least 2 mol% of units having acidic side groups and, in addition to the acidic side groups, at least 2 mol% of units having basic groups which are capable of being protonated.

The polymer preferably is a copolymer which comprises at least 2 mol% of units having a basic side group, optionally non-ionic units, and at least 2 mol% of units having an acidic side group which is capable of forming a salt (preferably with a divalent or polyvalent metal cation).

Monomer units having basic side groups which can be used comprise compounds which contain aliphatic or aromatic amino groups, in particular tertiary amino groups, for example, dimethylaminoethyl acrylate, dimethylaminoethyl methacrylate and vinylpyridine.

Non-ionic (i.e., non-acidic and non-basic) components which can be used comprise vinyl compounds, for example, acrylic esters such as ethyl, propyl, butyl, hexyl and decyl acrylate and the corresponding methacrylic esters, and styrene, isoprene and butadiene.

Suitable acidic components include, inter alia, carboxylic, sulfonic and phosphonic acids, for example, acrylic, methacrylic, vinylphosphonic, vinylsulfonic, maleic, itaconic, vinylbenzoic, vinylnaphthoic, vinylphenylsulfonic, vinylphenylphosphonic and cinnamic acid.

The ratio of the monomer units can be varied within wide limits. For example, the molar ratios of acidic to basic monomer units can vary from about 2:98 to 98:2. It is, however, particularly preferred to have a ratio of about 1:1 (equimolar). Non-ionic, neutral groups can additionally be used in the copolymer to adjust solubility.

The acidic groups produce good adhesion to the (anodized) aluminum substrate and, in the acidic dampening solution, the basic groups bring about an additional hydrophilization of the non-image areas and improve the adhesion of the image areas due to interaction with layer constituents. Since the groups are anchored to a polymer structure, a plurality of anchoring positions to the layer and to the support are present and the risk of washing off the polymers during the printing process is considerably reduced. The mean molecular weight is at least 1,000, preferably between about 5,000 and 50,000. It is, however, also technically advantageous to use polymers which have mean molecular weights exceeding 50,000. The copolymers are preferably dissolved in water with an addition of acids or hydroxide solutions, such that the pH is adjusted between about 1 and 13, preferably between about 3 and 10.

Additional useful copolymers are described in Ser. Nos. 07/731,463 (continued as 08/024,840) 07/731,465, 07/731,462 and 07/731,464 (now U.S. Pat. Nos. 5,262,244, 5,178,963, 5,219,664 and 5,178,961) which are incorporated by reference.

The above-described compounds can also be employed in the form of their metal or ammonium salts, the salts of divalent or polyvalent metals being particularly preferred. To prepare metal salts of the copolymers, the metal cations are generally used in the form of their salts with anions of mineral acids or in the form of acetates. The divalent, trivalent or tetravalent, in particular divalent, metal cations are preferred. The cations of the coating comprise, in particular, $V^{5+}$, $Bi^{3+}$, $Al^{3+}$, $Fe^{3+}$, $Zr^{4+}$, $Sn^{4+}$, $Ca^{2+}$, $Ba^{2+}$, $Sr^{2+}$, $Ti^{3+}$, $Co^{2+}$, $Fe^{2+}$, $Mn^{2+}$, $Ni^{2+}$, $Cu^{2+}$, $Ce^{4+}$, $Zn^{2+}$ or $Mg^{2+}$ ions.

These reaction products can be prepared in a simple manner in an aqueous solution at temperatures from about 20° to 100° C., preferably at about 25° to 40° C. The metal salt, dissolved in water or, if necessary, dissolved in a dilute mineral acid, is slowly added dropwise to the aqueous polymer solution. In the process, the reaction components react immediately to form the above-described products. The rapid start of the reaction may become evident (depending on the metal cation used) by an immediate color change of the solution or by formation of a deposit.

For purification, the products can be precipitated by neutralizing the reaction solution with dilute alkali metal hydroxide or ammonia solutions, the non-reacted starting products remaining in the solution. The yields obtained in these reactions are above 90%. Instead of using the polymers in the form of their acids, as described above, it is also possible to use the polymers in the form of their salts having a monovalent cation, for example sodium or ammonium salt.

The surface of the aluminum used for the production of the support materials for offset-printing plates according to the present invention is treated with the aqueous solutions of the copolymers in concentrations of about 0.001 to 10%, preferably in concentrations of about 0.1 to 1%.

The substrates are appropriately treated with these solutions by immersing plates of a particular size in the solutions or by passing a substrate web through a bath containing these solutions. Temperatures of about 20° to 95° C., preferably about 40° to 80° C. and dwell times of about 1 s to 10 min, preferably about 2 s to min, are most advantageously used for practical application. A higher bath temperature accelerates chemisorption of the copolymers and of the polymer-metal complexes on the substrate. As a result of this, dwell times can be reduced considerably, in particular in a continuous web treatment. Immersion treatment is appropriately followed by rinsing with water. The substrate treated in this manner is then dried at temperatures of about 110° to 130° C. The pH value is adjusted between about 1 and 13, preferably between about 3 and 10, in particular to a value in the range from about 4 to 8.

A two-stage process can also be used for treating the aluminum substrate with the salts of the copolymers. In the first stage of this process, the substrate is, for example, immersed in about an 0.01 to 10% strength, preferably about 0.1 to 5% strength, aqueous solution of the starting polymer. Rinsing or drying of the substrate is not required before it is introduced into a second bath containing about an 0.1% strength to saturated, preferably about 0.5 to 10% strength, aqueous salt solution with the above-described polyvalent metal ions. Rinsing and drying are then carried out as specified for the one-stage process. In the two-stage treatment, the above-described reaction products are formed on the substrate during the treating process. Using this process variant, even the reaction products of trivalent metal ions, which are sparingly soluble in strongly acidic media, can be applied to the substrate.

Assessing the weight of the hydrophilic coating is problematic, since even small amounts of the product applied show noticeable effects and are relatively firmly anchored in and on the surface of the support material. It may be assumed, however, that the amount applied is clearly below 1mg/dm$^2$, in particular below 0.8 mg/dm$^2$.

The support materials of the present invention so prepared can then be coated with various photosensitive layers to produce offset-printing plates.

Suitable substrates for use in the production of the support materials according to the invention include those of aluminum or of an aluminum alloy. Examples are "pure aluminum" (DIN Material No. 3.0255), i.e., composed of not less than 99.5% Al, and the following permissible admixtures (maximum total 0.5%) of 0.3% Si, 0.4% Fe, 0.03% Ti, 0.02% Cu, 0.07% Zn and 0.03% of other substances, and "Al-alloy 3003" (comparable with DIN Material No. 3.0515), i.e., composed of not less than 98.5% Al, with 0 to 0.3% Mg, and 0.8 to 1.5% Mn as alloying constituents, and the following permissible admixtures of 0.5% Si, 0.5% Fe, 0.2% Ti, 0.02% Zn, 0.1% Cu and 0.15% of other substances. The process according to the invention can, however, also be used with other aluminum alloys.

The aluminum support materials for printing plates which are customarily employed in practice are generally roughened by mechanical (e.g., brushing and/or abrasive treatments), chemical (e.g., etchants), or electrochemical processes (e.g., treatment with an alternating current in aqueous HCl and/or $HNO_3$ solutions) before applying the photosensitive coating. For the purpose of the present invention, aluminum printing plates which have been electrochemically roughened are preferably used.

The process parameters in the roughening step are generally within the following ranges: temperature of the electrolyte between about 20° and 60° C., concentration of active substance (acid, salt) between about 5 and 100 g/l current density between about 15 and 130 A/dm$^2$, dwell time between 10 and 100 seconds and flow rate of the electrolyte, measured on the surface of the workpiece to be treated, between about 5 and 100 cm/second. The type of current used is in most cases alternating current. However, it is also possible to use modified current types, e.g., an alternating current with different amplitudes of current strength for the anode and cathode current.

The mean peak-to-valley roughness, $R_z$ of the roughened surface is in the range from about 1 to 15 $\mu$m, particularly in the range from about 2 to 7 $\mu$m.

The peak-to-valley roughness, $R_z$ is determined according to DIN 4768, October 1970, as the arithmetic mean calculated from the individual peak-to-valley roughness values of five mutually adjacent individual measurement lengths. The individual peak-to-valley roughness is defined as the distance between two lines, parallel to the median line, which respectively touch the roughness profile at the highest and lowest points within the individual measuring-length. The individual measuring-length is one fifth of the length, projected perpendicularly onto the median line, of that portion of the roughness profile which is directly utilized for the evaluation. The median line is the line which is parallel to the general direction of the roughness profile and which has the shape of the geometrically ideal profile, this line dividing the roughness profile in a manner such that the total of the areas above it which are occupied by material is equal to the total of the areas beneath it which are not occupied by material.

The electrochemical roughening process is followed by an anodic oxidation of the aluminum in a further optional process step, in order to improve, for example, the abrasion and adhesion properties of the surface of the support material. Conventional electrolytes, such as $H_2SO_4$, $H_3PO_4$, $H_2C_2O_4$, amidosulfonic acid, sulfosuccinic acid, sulfosalicylic acid or mixtures thereof, can be used for the anodic oxidation.

By way of example, the following standard methods are representative of the use of aqueous electrolytes, containing $H_2SO_4$, for the anodic oxidation of aluminum. (See, in this regard, e.g. M. Schenk, Werkstoff Aluminium und seine anodische Oxydation (The Material Aluminum and its Anodic Oxidation), Francke Verlag, Bern, 1948, page 760; Praktische Galvanotechnik (Practical Electroplating), Eugen G. Leuze Verlag, Saulgau, 1970, pages 395 et seq., and pages 518/519; W. Huebner and C. T. Speiser, Die Praxis der anodischen Oxidation des Aluminiums (Practical Technology of the Anodic Oxidation of Aluminum), Aluminium Verlag, Duesseldorf, 1977, 3rd Edition, pages 137 et seq.) In the direct current sulfuric acid process, anodic oxidation is carried out in an aqueous electrolyte which conventionally contains approximately 230 g of $H_2SO_4$ per 1 liter of solution, for 10 to 60 minutes at 10° to 22° C., and at a current density of 0.5 to 2.5 A/dm$^2$. In this process, the sulfuric acid concentration in the aqueous electrolyte solution can also be reduced to 8 to 10% by weight of $H_2SO_4$ (about 100 g of $H_2SO_4$ per liter), or increased to 30% by weight (365 g of $H_2SO_4$ per liter), or more. In the "hard-anodizing process", the anodizing is carried out using an aqueous electrolyte, containing $H_2SO_4$ in a concentration of 166 g of $H_2SO_4$ per liter (or about 230 g of $H_2SO_4$ per liter), at an operating temperature of 0° to 5° C., and a current density of 2 to 3 A/dm$^2$, for 30 to 200 minutes, and at a voltage which rises from approximately 25 to 30 V at the beginning of the treatment, to approximately 40 to 100 V toward the end of the treatment.

In addition to the above-described processes for the anodic oxidation of aluminum, the following processes can also be used: the anodic oxidation of aluminum in an aqueous electrolyte containing $H_2SO_4$, in which the content of $Al^{3+}$ ions is adjusted to values exceeding 12 g/l (according to DE-A-28 11 396=U.S. Pat. No. 4,211,619), in an aqueous electrolyte containing $H_2SO_4$ and $H_3PO_4$ (according to DE-A-27 07 810=U.S. Pat. No. 4,049,504), or in an aqueous electrolyte containing $H_2SO_4$ and $Al^{3+}$ ions (according to DE-A-28 36 803=U.S. Pat. No. 4,229,226).

Direct current is preferably used for the anodic oxidation, but it is also possible to use alternating current or a combination of these types of current (for example, direct current with superimposed alternating current). The layer weights of aluminum oxide range from about 1 to 10 g/m$^2$, which corresponds to layer thicknesses from about 0.3 to 3.0 μm.

Suitable photosensitive layers basically comprise any layers which, after exposure, optionally followed by development and/or fusing, yield a surface in image configuration, which can be used for printing. The layers are applied to one of the conventionally used support materials by the manufacturers of presensitized printing plates or directly by the user.

In addition to the layers which contain silver halides and which are used in many fields, various other layers are also known, such as those described, for example, in "Light-Sensitive Systems", Jaromir Kosar, John Wiley & Sons, New York, 1965. These include colloid layers containing chromates and dichromates (Kosar, Chapter 2); layers containing unsaturated compounds, which, upon exposure, are isomerized, rearranged, cyclized, or crosslinked (Kosar, Chapter 4); layers containing photopolymerizable compounds, which, upon exposure, undergo polymerization of the monomers or prepolymers, optionally with the aid of an initiator (Kosar, Chapter 5); and layers containing o-diazoquinones, such as naphthoquinone-diazides, p-diazoquinones, or condensation products of diazonium salts (Kosar, Chapter 7). Other suitable layers include the electrophotographic layers, i.e. layers which contain an inorganic or organic photoconductor. In addition to the photosensitive substances, these layers can, of course, also contain other constituents, such as resins, dyes or plasticizers. In particular, the photosensitive compositions or compounds described below can be employed in the coating of support materials prepared according to the process of the present invention.

Positive-working o-quinone diazide compounds, preferably o-naphthoquinone diazide compounds, which are described, for example, in DE-C-854 890, 865 109, 879 203, 894 959, 938 233, 11 09 521, 11 44 705, 11 18 606, 11 20 273 and 11 24 817, can be employed.

Negative-working condensation products from aromatic diazonium salts and compounds with active carbonyl groups, preferably condensation products formed from diphenylaminediazonium salts and formaldehyde, are also useful. Such products are described, for example, in DE-C-596 731, 11 38 399, 11 38 400, 11 38 401, 11 42 871, and 11 54 123, U.S. Pat. No. 2,679,498 and 3,050,502 and UK 712,606.

Negative-working co-condensation products of aromatic diazonium compounds can be used, for example, those according to DE-A-20 24 244, which possess, in each case, at least one unit of the general types $A(—D)_n$ and B, connected by a divalent linking member derived from a carbonyl compound which is capable of participating in a condensation reaction. In this context, the symbols are defined as follows: A is the radical of a compound which contains at least two aromatic carbocyclic and/or heterocyclic nuclei, and which is capable, in an acid medium, of participating in a condensation reaction with an active carbonyl compound, at one or more positions. D is a diazonium salt group which is bonded to an aromatic carbon atom of A, n is an integer from 1 to 10, and B is the radical of a compound which contains no diazonium groups and which is capable, in an acid medium, of participating in a condensation reaction with an active carbonyl compound, at one or more positions on the molecule.

Positive-working layers can be employed which contain a compound which, on being irradiated, splits off an acid, a compound which possesses at least one C-O-C group, which can be split off by acid (e.g., an orthocarboxylic acid ester group, a carboxamide-acetal group or an acetal group), and, if appropriate, a binder.

Also useful are negative-working layers, composed of photopolymerizable monomers, photoinitiators, binders and, if appropriate, further additives. In these layers, for example, acrylic and methacrylic acid esters, or reaction products of diisocyanates with partial esters of polyhydric alcohols are employed as monomers, as described, for example, in U.S. Pat. No. 2,670,863 and 3,060,023, and in DE-A-20 64 079 and 23 61 041. Suitable photoinitiators are, inter alia, benzoin, benzoin ethers, polynuclear quinones, acridine derivatives, phenazine derivatives, quinoxaline derivatives, quinazoline derivatives, or synergistic mixtures of various ketones. A large number of soluble organic polymers can be employed as binders, for example, polyamides, polyesters, alkyd resins, polyvinyl alcohol, polyvinyl-pyrrolidone, polyethylene oxide, gelatin or cellulose ethers.

Negative-working layers according to DE-A-30 36 077 can also be used. These layers contain, as the photosensitive compound, a diazonium salt polycondensation product, or an organic azido compound, and, as the binder, a high-molecular weight polymer with alkenylsulfonylurethane or cycloalkenylsulfonylurethane side groups.

It is also possible to apply photosemiconducting layers to the support materials such as described, for example, in DE-C-11 17 391, 15 22 497, 15 72 312, 23 22 046 and 23 22 047, as a result of which highly photosensitive electrophotographic layers are formed.

The coated offset-printing plates which are obtained from the support materials according to the invention are converted into the desired printing form, in a known manner, by imagewise exposure or irradiation, and rinsing the non-image areas with a developer, preferably an aqueous developing solution. Surprisingly, in comparison with plates which were treated with high-polymer acrylic acid, with polymeric vinylphosphonic acid or merely with hot water, offset-printing plates whose base materials were treated according to the invention exhibited markedly reduced adsorption of dyes and improved hydrophilic properties. In addition, the photosensitive layers of the samples treated according to the invention showed better adhesion to the support surface than the photosensitive layers of the comparative examples.

EXAMPLES OF PREPARING A ROUGHENED AND ANODIZED PRINTING-PLATE SUPPORT

A1: A mill-finished aluminum web (DIN material No. 3.0255) having a thickness of 0.3 mm is degreased using a 2% strength aqueous-alkaline pickling solution at an elevated temperature of about 50° to 70° C. The aluminum surface is electrochemically roughened by applying an alternating current in an electrolyte containing $HNO_3$. A surface roughness having an $R_Z$-value of 6 μm is obtained in the process. Roughening is followed by anodic oxidation in an electrolyte containing sulfuric acid, according to the process described in DE-A-28 11 396; the oxide weight obtained is about 3.0 g/m$^2$.

A support prepared in this manner is referred to as number 1 in Tables 2 and 3.

The aluminum web thus prepared is then passed through a bath of a 0.5% strength solution at 60° C., which contains one of the polymers according to the invention or one of the comparative substances (A to C), adjusted to pH 5 to 6 by means of $H_3PO_4$ or NaOH. The compositions of these solutions are listed in Table 1. The dwell time in the bath is 30 seconds. In a following rinsing step any excess solution is rinsed off with tap water and the web is then dried with hot air at temperatures between 100° and 130° C.

A2: A mill-finished aluminum web (DIN material No. 3.0515) having a thickness of 0.3 mm is degreased using a 2% strength aqueous-alkaline pickling solution at an elevated temperature of about 50° to 70° C. The aluminum surface is electrochemically roughened by applying an alternating current in an electrolyte containing hydrochloric acid. A surface roughness having an $R_Z$-value of 6 μm is obtained in the process. Roughening is followed by anodic oxidation in an electrolyte containing sulfuric acid, according to the process described in DE-A-28 11 396; the oxide weight obtained is about 3.0 g/m$^2$.

A support prepared in this manner is referred to as number 2 in Tables 2 and 3.

The aluminum web thus prepared is then passed through a bath of a 0.5% strength solution at 50° C., which contains one of the polymers according to the invention or one of the comparative substances (A to C), adjusted to pH 5 to 6 by means of $H_3PO_4$ or NaOH. The compositions of these solutions are listed in Table 1.

A3: A mill-finished aluminum web (DIN material No. 3.0255) having a thickness of 0.2 mm is degreased using a 2% strength aqueous-alkaline pickling solution at an elevated temperature of about 50° to 70° C. The support is then brushed with the application of cutting graining agents. The surface roughness obtained shows an $R_Z$-value of 4 μm. Roughening is followed by anodic oxidation in an electrolyte containing phosphoric acid, according to the process described in DE-C-16 71 614 (=U.S. Pat. No. 3,511,661). The oxide weight obtained in 0.9 g/m$^2$. The aluminum web treated in this manner is cut into sheets of 50×45 cm.

A support so prepared is referred to as number 3 in Table 2.

The supports thus prepared are immersed in a bath at 60° C. consisting of a 0.4% strength aqueous solution of one of the post-treating agents listed under A to N in Table 1, which has been adjusted to pH 5 to 6 by means of $H_3PO_4$ or NaOH. The dwell time in the bath is 60 seconds. In a rinsing step, any excess solution is then rinsed off with demineralized water and the support is air-dried.

TABLE 1

| Reagents used for post-treating: | | |
|---|---|---|
| A: | polyvinyl phosphonic acid | |
| B: | polyacrylic acid | |
| C: | hot water | |
| D: | dimethylaminoethyl methacrylate | 33.3 mol % |
| | ethyl acrylate | 33.3 mol % |
| | methacrylic acid | 33.3 mol % |
| E: | dimethylaminoethyl methacrylate | 50.0 mol % |
| | methacrylic acid | 50.0 mol % |
| F: | dimethylaminoethyl methacrylate | 10.0 mol % |
| | butyl methacrylate | 80.0 mol % |
| | methacrylic acid | 10.0 mol % |
| G: | dimethylaminoethyl methacrylate | 20.0 mol % |
| | ethyl acrylate | 10.0 mol % |
| | vinylphosphonic acid | 70.0 mol % |
| H: | dimethylaminoethyl methacrylate | 33.3 mol % |
| | ethyl acrylate | 33.3 mol % |
| | vinylphosphonic acid | 33.3 mol % |
| I: | dimethylaminoethyl methacrylate | 20.0 mol % |
| | ethyl acrylate | 10.0 mol % |
| | vinylsulfonic acid | 70.0 mol % |
| K: | vinylpyridine | 40.0 mol % |
| | ethyl acrylate | 20.0 mol % |
| | methacrylic acid | 40.0 mol % |
| L: | dimethylaminoethyl methacrylate | 40.0 mol % |
| | methyl methacrylate | 20.0 mol % |
| | acrylic acid | 40.0 mol % |
| M: | vinylpyridine | 40.0 mol % |
| | ethyl acrylate | 15.0 mol % |
| | vinylphosphonic acid | 45.0 mol % |
| N: | dimethylaminoethyl methacrylate | 70.0 mol % |
| | styrene | 10.0 mol % |
| | methacrylic acid | 20.0 mol % |

The support materials described under A1 to A3 above were each treated with 13 different solutions such that a total of 39 post-treated supports were obtained. They are compiled in Table 2, together with the measuring results explained below.

Some of the supports were not immersion-treated as described under A1 to A3, but were subjected to an electrochemical posttreatment, which is described as follows:

Electrochemical Treatment

Supports from Example A2 are immersed in an 0.2% strength solution of reagents A to N (Table 1) at 40° C. The supports act as the anode and are treated for 20 seconds by applying a direct current of 10 volts. In a subsequent rinsing step any excess solution is removed with demineralized water and the supports are air-dried. The supports prepared in this manner and the results of the measurements described below are compiled in Table 3.

The following measurements were made on each of the support materials obtained according to the examples:

Testing the Alkali-Resistance of the Surface

The rate, in seconds, at which an aluminum oxide layer dissolves in an alkaline zincate solution is measured to determine the resistance to alkali. The longer the layer requires to dissolve, the greater is its resistance to alkali. The layer thicknesses should be approximately comparable, since, of course, they also represent a parameter for the rate of dissolution. A drop of a solution, composed of 500 ml of distilled $H_2O$, 480 g of KOH and 80 g of zinc oxide, is placed on the surface to be tested, and the time which elapses before the appearance of metallic zinc is measured, this event being recognizable by a dark coloration of the test spot. This "zincate test" is mentioned in column 4 of Table 2. The test method is described, for example, in U.S. Pat. No. 3,940,321, columns 3 and 4, lines 29 to 68 and lines 1 to 8.

Testing the Hydrophilic Character of the Support Materials

This test is carried out by measuring the contact angle of a water droplet placed on the support. In this method, the angle formed between the support surface under the droplet and a tangent line passing through the contact point of the droplet is determined; in general the angle is between about 0 and 90 degrees. The better the wetting is, the smaller the angle.

The data given in column 5 of Table 2 refer to this process of measuring the contact angle.

Coating the Supports with Photosensitive Materials

D1: A piece of each of the supports described in Examples A1 to A3 is coated with the following solution:

6.6 pbw of a cresol-formaldehyde novolak (having a softening range from 105° to 120° C. according to DIN 53 181),
1.1 pbw of the 4-(2-phenylprop-2-yl)-phenyl ester of1,2-naphthoquinone-2-diazide-4-sulfonic acid,
0.6 pbw of 2,2'-bis-(1,2-naphthoquinone-2-diazide-5-sulfonyloxy)-dinaphthyl-(1,1')-methane,
0.24 pbw of 1,2-naphthoquinone-2-diazide-4-sulfochloride,
0.08 pbw of crystal violet,
91.36 pbw of a solvent mixture composed of 4 parts by volume of ethylene glycol monomethyl ether, 5 parts by volume of tetrahydrofuran and 1 part by volume of butyl acetate.

Here, pbw=parts by weight.

The coated supports are dried in a drying oven at temperatures up to 120° C. The printing plates thus prepared are exposed under a positive original and developed with a developer of the following composition:

5.3 pbw of sodium metasilicate×9 $H_2O$
3.4 pbw of trisodium phosphate×12 $H_2O$
0.3 pbw of sodium dihydrogenphosphate (anhydrous)
91.0 pbw of water The printing forms obtained are visually assessed for a possible dye residue (blue staining) remaining in the non-image areas. The results are given in column 6 of Table 2.

D2: A piece of each of the supports described in Examples A1 to A3 is coated with the following negative-working photosensitive layer:

16.75 pbw of an 8% strength solution of the reaction product obtained by reacting a polyvinylbutyral, having a molecular weight of 70,000 to 80,000 and comprising 71% by weight of vinylbutyral units, 2% by weight of vinylacetate units and 27% by weight of vinyl alcohol units, with propenylsulfonylisocyanate,
2.14 pbw of 2,6-bis-(4-azido-benzal)-4-methylcyclohexanone
0.23 pbw of ®Rhodamin 6 GDN extra and
0.21 pbw of 2-benzoylmethylene-1-methyl-β-naphthothiazoline in
100 pbv of ethylene glycol monomethyl ether and
50 pbv of tetrahydrofuran.

Here, pbv=parts by volume.

The supports are dried as described under D1 above.

The dry layer weight is 0.75 $g/m^2$. The reproduction layer is exposed for 35 seconds under a negative original using a 5 kW metal halide lamp. A plush pad is used for developing the exposed layer with a developer solution of the following composition:

5 pbw of sodium lauryl sulfate
1 pbw of sodium metasilicate×5 $H_2O$
94 pbv of water The non-image areas of the printing forms obtained are visually assessed for layer residues which are possibly still present. The results of this assessment are listed in column 7 of Table 2, compared to the prior art (A).

The symbols given in Table 2 have the following significations:

–: worse than the prior art according to the comparative sample treated with solution A
o: equal to the prior art according to the comparative sample treated with solution A
+: better than the prior art according to the comparative sample treated with solution A D3: An anodically oxidized support prepared according to Example 15 of Table 2 is used for the production of an electrophotographic offset-printing plate by applying the following solution:

10 pbw of 2,5-bis-(4'-diethylaminophenyl)-1,3,4-oxadiazole,
10 pbw of a copolymer of styrene and maleic anhydride having a softening point of 210° C.,
0.02 pbw of ®Rhodamin FB (C.I. 45 170),
300 pbw of ethylene glycol monomethyl ether.

The supports are dried as described under D1 above. A corona is used for charging the layer in the dark to about –400 V. The charged plate is imagewise exposed in a reprographic camera and then developed with an electrophotographic suspension developer, comprising a dispersion of 3.0 parts by weight of magnesium sulfate in a solution of 7.5 parts by weight of pentaerythritol resin ester in 1,200 parts by volume of an isoparaffin mixture having a boiling range from 185° to 210° C. After removing the excess developer liquid the developer is fused and the plate immersed for 60 seconds in a solution composed of 35 pbw of sodium metasilicate×9 $H_2O$,
140 pbw of glycerol
550 pbv of ethylene glycol and
140 pbv of ethanol The plate is then rinsed with a strong jet of water such that those portions of the photoconductor layer which are not covered by toner are removed. The plate is then ready for printing The non-image areas of the plate have a good hydrophilicity and do not show any signs of attack even after the action of alkaline solutions The printing form yields a print run of well over ten thousand copies.

TABLE 2

| Example No. | 2 Support | 3 Post-treating agent | 4 Zincate test time(s) | 5 Contact angle | 6 Absorption of dyes 1)* | 7 Layer residues 2)* |
|---|---|---|---|---|---|---|
| 1 | 1 | E | o | + | + | + |
| 2 | 1 | F | o | + | + | + |
| 3 | 1 | E | o | + | + | + |
| 4 | 1 | G | o | + | + | + |
| 5 | 1 | L | o | + | + | + |
| 6 | 1 | H | o | + | + | o |
| 7 | 1 | K | o | + | + | o |
| 8 | 1 | M | o | + | + | o |
| 9 | 1 | I | o | + | + | o |
| 10 | 1 | N | o | + | + | o |
| (c)11 | 1 | B | o | – | + | – |
| (c)12 | 1 | A | o | o | o | o |
| (c)13 | 1 | C | – | – | – | – |
| 14 | 2 | D | + | o | + | + |
| 15 | 2 | F | o | o | + | + |
| 16 | 2 | E | o | o | + | + |
| 17 | 2 | G | o | + | + | + |
| 18 | 2 | L | o | + | + | + |
| 19 | 2 | H | o | + | + | o |
| 20 | 2 | K | o | + | + | + |
| 21 | 2 | M | o | + | + | o |
| 22 | 2 | I | o | + | + | o |
| 23 | 2 | N | o | o | + | o |
| (c)24 | 2 | B | o | – | + | – |
| (c)25 | 2 | A | o | o | o | o |
| (c)26 | 2 | C | – | – | – | – |
| 27 | 3 | D | + | + | + | + |
| 28 | 3 | F | + | + | + | + |
| 29 | 3 | E | + | + | + | + |
| 30 | 3 | G | o | + | + | + |
| 31 | 3 | L | o | + | + | + |
| 32 | 3 | H | o | + | + | o |
| 33 | 3 | K | o | + | + | o |
| 34 | 3 | M | o | + | + | o |
| 35 | 3 | I | o | + | + | o |
| 36 | 3 | N | o | + | + | o |
| (c)37 | 3 | B | o | – | + | – |
| (c)38 | 3 | A | o | o | o | o |
| (c)39 | 33 | C | o | – | – | – |

1)* for positive layers
2)* for negative layers
(c) comparison

As is evident from Table 2, many properties of the products according to the invention are superior to the prior art and none are inferior to the prior art.

TABLE 3

| Example No. | 2 Support | 3 Post-treating agent | 4 Zincate test time(s) | 5 Contact angle | 6 Absorption of dyes 1)* | 7 Layer residues 2)* |
|---|---|---|---|---|---|---|
| 40 | 2 | D | + | + | + | + |
| 41 | 2 | F | + | + | + | + |
| 42 | 2 | E | + | o | + | + |
| 43 | 2 | G | + | o | + | + |
| 44 | 2 | L | + | o | + | + |
| 45 | 2 | H | + | o | + | o |
| 46 | 2 | K | + | o | + | + |
| 47 | 2 | M | + | o | + | + |
| 48 | 2 | I | + | o | + | + |
| 49 | 2 | N | + | o | + | o |
| (c)50 | 2 | B | – | – | + | – |
| (c)51 | 2 | A | o | o | o | o |

1)* for positive layers
2)* for negative layers
(c) comparison

As shown in Table 3, the electrochemically post-treated supports produce the same good results as obtained according to Table 2, the values of the zincate test, in particular, being even improved.

In addition to the above-described tests, which were carried out on all supports, supports prepared according to Examples 1 to 3 of Table 2 were coated with a positive-working photosensitive layer as described in Example D1 and printing forms were produced by exposure and development. These printing forms were used in printing tests which yielded excellent prints up to a print run of 210,000. A printing form prepared in an analogous manner, but using a support from Comparative Example A (Table 2) showed a poorer roll-up behavior. After printing 170,000 copies fine screen dots were no longer properly reproduced.

What is claimed is:

1. A support material for offset-printing plates, which comprises mechanically, chemically or electrochemically roughened aluminum or an aluminum alloy in the form of a sheet, a foil or a web, and which is coated on at least one side with a hydrophilic coating comprising a hydrophilic polymer having a mean molecular weight of at least 1,000, which comprises (a) at least 2 mol% of units having acidic side groups and (b) at least 2 mol% of units having basic side groups which are capable of being protonated.

2. A support material as claimed in claim 1, wherein said aluminum or aluminum alloy is anodized.

3. A support material as claimed in claim 1, wherein said hydrophilic polymer is a copolymer comprising monomer units having basic groups and monomer units having acidic groups.

4. A support material as claimed in claim 3, wherein said monomer units having basic groups have an amino group.

5. A support material as claimed in claim 4, wherein said amino group contains at least one alkyl or aryl moiety.

6. A support material as claimed in claim 4, wherein the amino group is a tertiary amino group.

7. A support material as claimed in claim 4, wherein said amino group is selected from at least one of dimethylaminoethyl acrylate, dimethylaminoethyl methacrylate, and vinylpyridine.

8. A support material as claimed in claim 3, wherein said monomer units having acidic groups have a carboxyl moiety.

9. A support material as claimed in claim 3, wherein said monomer units having acidic groups have a sulfonic acid group.

10. A support material as claimed in claim 3, wherein said monomer units having acidic groups have a phosphonic acid group.

11. A support material as claimed in claim 3, wherein said hydrophilic copolymer further comprises monomer units which are non-acidic and non-basic.

12. A support material as claimed in claim 11, wherein the molar ratio of the basic monomer units to the acidic monomer units is about equimolar.

13. A support material as claimed in claim 12, wherein the molar ratio of the ionic monomer units to the monomer units which are non-acidic and non-basic ranges from about 4:96 to 100:10.

14. A support material as claimed in claim 11, wherein said monomers which are non-acidic and non-basic are selected from at least one of acrylic esters, methacrylic esters, styrene, isoprene, and butadiene.

15. A support material as claimed in claim 3, wherein the monomer ratio of the basic monomer units present in the copolymer to the acidic monomer units varies in the range from about 2:98 to 98:2.

16. A support material as claimed in claim 15, wherein the molar ratio of the basic monomer units to the acidic monomer units is about equimolar.

17. A support material as claimed in claim 3, wherein the acidic groups are selected from at least one of acrylic, methacrylic, vinylphosphonic, vinylsulfonic, maleic, itaconic, vinyl benzoic, vinylnaphthoic, vinylphenylsulfonic, vinylphenylphosphonic, and cinnamic acid.

18. A support material as claimed in claim 3, wherein the polymer comprises monomer units of dimethylaminoethyl methacrylate and at least one of methacrylic acid, acrylic acid, vinylphosphonic acid, and vinyl sulfonic acid.

19. A support material as claimed in claim 18, wherein the polymer further comprises monomer units of at least one of styrene, ethyl acrylate, methyl methacrylate, and butyl methacrylate.

20. A support material as claimed in claim 3, wherein the polymer comprises monomer units of vinylpyridine and at least one of methacrylic acid and vinylphosphonic acid.

21. A support material as claimed in claim 20, wherein the polymer further comprises monomer units of ethyl acrylate.

22. A support material as claimed in claim 1, wherein said hydrophilic polymer has a mean molecular weight of 5,000 to 50,000.

23. The support material as claimed in claim 1, wherein said hydrophilic polymer has a mean molecular weight of more than 50,000.

24. A support material as claimed in claim 1, wherein said acidic side groups are present in the form of metal salts with metal cations.

25. A support material as claimed in claim 24, wherein said metal cations are $V^{5+}$, $Bi^{3+}$, $Al^{3+}$, $Fe^{3+}$, $Zr^{4+}$, $Sn^{4+}$, $Ca^{2+}$, $Ba^{2+}$, $Sr^{2+}$, $Ti^{3+}$, $Co^{2+}$, $Fe^{2+}$, $Mn^{2+}$, $Ni^{2+}$, $Cu^{2+}$, $Ce^{4+}$, $Zn^{2+}$ or $Mg^{2+}$ ions.

26. A support material as claimed in claim 1, wherein said aluminum or aluminum alloy is electrochemically roughened.

27. A support material as claimed in claim 1, wherein the roughened surface of said aluminum or aluminum alloy has a mean peak-to-valley roughness $R_z$ of about 1 to 15 $\mu$m.

28. A support material as claimed in claim 1, wherein the polymer has a mean molecular weight of at least about 5,000.

29. A support material as claimed in claim 1, wherein the acidic side groups are present in the form of their sodium or ammonium salts.

30. A support material as claimed in claim 1, wherein the amount of hydrophilic coating is less than 1 $mg/dm^2$.

31. A support material as claimed in claim 1, wherein the acidic groups are free acid groups.

* * * * *

UNITED STATES PATENT AND TRADEMARK OFFICE

CERTIFICATE OF CORRECTION

PATENT NO. : 5,302,460

DATED : April 12, 1994

INVENTOR(S) : Engelbert PLIEFKE et al.

It is certified that error appears in the above-indentified patent and that said Letters Patent is hereby corrected as shown below:

Title page, item [54], line 3, please add --,-- after the word WEB;

between item [73] and [21], please add --[*] Notice: The portion of the term of this patent subsequent to Nov. 16, 2010 has been disclaimed.--.

Column 1, line 3, in the title, "A WEB" should read --A WEB,--.

Column 17, line 65, "100:10." should read --100:0.--.

Signed and Sealed this

Eleventh Day of October, 1994

Attest:

BRUCE LEHMAN

Attesting Officer

Commissioner of Patents and Trademarks